United States Patent
Zhang et al.

(10) Patent No.: US 10,853,550 B1
(45) Date of Patent: Dec. 1, 2020

(54) SAMPLING SELECTION FOR ENHANCED HIGH YIELD ESTIMATION IN CIRCUIT DESIGNS

(71) Applicant: Cadence Design Systems, Inc., San Jose, CA (US)

(72) Inventors: Wangyang Zhang, San Jose, CA (US); Hongzhou Liu, San Jose, CA (US); Richard J. O'Donovan, San Jose, CA (US); Michael Tian, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/027,231

(22) Filed: Jul. 3, 2018

(51) Int. Cl.
*G06F 30/367* (2020.01)
*G06F 17/50* (2006.01)
*G06F 111/10* (2020.01)
*G06F 119/18* (2020.01)

(52) U.S. Cl.
CPC ........ *G06F 30/367* (2020.01); *G06F 2111/10* (2020.01); *G06F 2119/18* (2020.01)

(58) Field of Classification Search
CPC ............... G06F 30/367; G06F 2219/18; G06F 2111/10; G06F 2119/18
See application file for complete search history.

(56) References Cited

U.S. PATENT DOCUMENTS

| | | | |
|---|---|---|---|
| 8,155,938 B2 | 4/2012 | Singhee et al. | |
| 8,601,416 B2 | 12/2013 | Kuo et al. | |
| 8,612,908 B2 | 12/2013 | Cooper et al. | |
| 8,806,418 B1 | 8/2014 | Jallepalli et al. | |
| 8,813,009 B1 | 8/2014 | Liu et al. | |
| 8,954,910 B1 | 2/2015 | Liu et al. | |
| 9,043,771 B1 | 5/2015 | Vardhan et al. | |
| 9,483,602 B2 | 11/2016 | McConaghy et al. | |
| 9,524,365 B1 | 12/2016 | Liu et al. | |

(Continued)

OTHER PUBLICATIONS

Sengupta, M., et al. "Application-Specific Worst Case Corners Using Response Surfaces and Statistical Models" IEEE Transactions on Computer-Aided Design of Integrated Circuits & Systems, vol. 24, No. 9, pp. 1372-1380 (2005) (Year: 2005).

(Continued)

*Primary Examiner* — Vuthe Siek
(74) *Attorney, Agent, or Firm* — Vista IP Law Group, LLP

(57) ABSTRACT

A method for performing multiple simulations for a circuit using a first plurality of samples is provided. The method includes obtaining a model of the circuit based on a result of the simulations, determining a failure rate and a confidence interval of the failure rate for the circuit with the performance model. The method includes determining an importance distribution based on the failure rate for the first plurality of samples, wherein the importance distribution is indicative of a probability that a sample value for the circuit will fail the simulation, selecting a second plurality of samples based on the importance distribution, performing a second set of simulations using the second plurality of samples to reduce the confidence interval of the failure rate. When the confidence interval is larger than a value, obtaining an updated performance model and performing new Monte Carlo simulations with new samples.

18 Claims, 10 Drawing Sheets

(56) References Cited

U.S. PATENT DOCUMENTS

| | | | |
|---|---|---|---|
| 9,836,564 B1 | 12/2017 | Zhang et al. | |
| 10,083,257 B2 | 9/2018 | Kuo et al. | |
| 2005/0288918 A1* | 12/2005 | Chen .................. | G06F 17/5036 703/22 |
| 2012/0046929 A1* | 2/2012 | Joshi .................. | G06F 17/5022 703/13 |
| 2012/0278050 A1* | 11/2012 | Hsiao ................ | G06F 17/5036 703/2 |
| 2013/0226544 A1* | 8/2013 | McConaghy ....... | G06F 17/5022 703/2 |
| 2013/0304439 A1 | 11/2013 | Van der Velden | |
| 2016/0283629 A1 | 9/2016 | Weckx et al. | |

OTHER PUBLICATIONS

Zhang, H., et al. "Efficient Design-Specific Worst-Case Corner Extraction for Integrated Circuits" IEEE 46th Design Automation Conf. (2009) available from <https://ieeexplore.ieee.org/abstract/document/5227114> (Year 2009).

Nourredine Akkouche et. al., Minimization of Functional Tests by Statistical Modelling of Analogue Circuits, Oct. 2007, Proceedings—2007 International Conference on Design and Technology of Integrated Systems in Nanoscale Era, pp. 35-40. (Year: 2007).

Sun et al., "Fast Statistical Analysis of Rare Circuit Failure Events via Scaled-Sigma Sampling for High-Dimensional Variation Space," IEEE Transactions on Computer-Aided Design of Integrated Circuits and Systems, vol. 34, No. 7, Jul. 2015, pp. 1096-1109.

Sheather et al., A Reliable Data-Based Bandwidth Selection Method for Kernel Density Estimation, 1991, Journal of the Royal Statistical Society, vol. 53, Issue 3, pp. 683-690. (Year: 1991).

Zhang et al., Accelerating Monte Carlo Analysis at Advanced Nodes, Jun. 22, 2016, pp. 1-9. (Year: 2016).

* cited by examiner

SAMPLING SELECTION FOR ENHANCED HIGH YIELD ESTIMATION IN CIRCUIT DESIGNS

TECHNICAL FIELD

Embodiments described herein are generally related to the field of circuit simulation for integrated circuit (IC) design and fabrication. More specifically, embodiments described herein are related to estimation, visualization and display of a performance distribution for an IC design using a limited number of Monte Carlo (MC) simulations.

BACKGROUND

In integrated circuit (IC) design, performing an accurate statistical analysis of rare circuit failure events typically involves lengthy calculations performed over large samples of a multi-dimensional parameter space. The statistical analysis typically involves MC simulations of the IC design using normalized distributions for each of a plurality of random variables involved in IC fabrication according to foundry provided data. The problem of obtaining accurate statistical samples becomes more acute for failure rate estimation of high yield IC designs. To increase the accuracy of a statistical model, current solutions commonly increase the size of the sample set for MC simulations, thereby creating a bottleneck for turnaround time in the design process.

It is desirable to develop a method and a strategy to reduce the size of the sample set for MC simulations, while at the same time obtaining equal or better accuracy for the failure rate of an IC design.

The description provided in the background section should not be assumed prior art merely because it is mentioned in or associated with the background section. The background section may include information that describes one or more aspects of the subject technology.

SUMMARY

In a first embodiment, a computer-implemented method includes performing multiple Monte Carlo simulations for an integrated circuit using a first plurality of samples, obtaining a performance model of the integrated circuit based on a result of the Monte Carlo simulations, and determining a failure rate and a confidence interval of the failure rate for the integrated circuit with the performance model. The computer-implemented method also includes determining an importance distribution based on the failure rate for the first plurality of samples, wherein the importance distribution is indicative of a probability that a sample value for the integrated circuit will fail the Monte Carlo simulation, selecting a second plurality of samples based on the importance distribution, and performing a second set of Monte Carlo simulations using the second plurality of samples to reduce the confidence interval of the failure rate. When the confidence interval of the failure rate is larger than a pre-determined value, the computer-implemented method includes obtaining an updated performance model, and performing new Monte Carlo simulations with samples based on an adjusted importance distribution based on the updated performance model.

In a second embodiment, a system is disclosed that includes a memory storing instructions and a processor configured to execute the instructions to cause the system to perform multiple simulations for an integrated circuit using a first plurality of samples and to obtain a performance model of the integrated circuit based on a result of the simulations. The processor also executes the instructions to cause the system to determine a failure rate and a confidence interval of the failure rate for the integrated circuit with the performance model, and to determine an importance distribution based on the failure rate for the first plurality of samples, wherein the importance distribution is indicative of a probability that a sample value for the integrated circuit will fail the simulation. The processor is also configured to execute the instructions to select a second plurality of samples based on the importance distribution, to perform a second set of simulations using the second plurality of samples to reduce the confidence interval of the failure rate. When the confidence interval of the failure rate is larger than a pre-determined value, the processor is configured to obtain an updated performance model and to perform new simulations with a new sample selected from an adjusted importance distribution based on the updated performance model.

In yet another embodiment, a non-transitory, machine-readable storage medium is disclosed that includes instructions which, when executed by a processor, cause a computer to perform a method including performing multiple Monte Carlo simulations for an integrated circuit using a first plurality of samples, obtaining a performance model of the integrated circuit based on a result of the Monte Carlo simulations, and determining a failure rate and a confidence level of the failure rate for the integrated circuit with the performance model. The method also includes, determining an importance distribution based on the failure rate for the first plurality of samples, wherein the importance distribution is indicative of a probability that a sample value for the integrated circuit will fail the Monte Carlo simulation, selecting a second plurality of samples based on the importance distribution, performing a second set of Monte Carlo simulations using the second plurality of samples to reduce the confidence interval of the failure rate. When the confidence interval of the failure rate is larger than a pre-determined value, the method includes obtaining an updated performance model and performing new Monte Carlo simulations with a new sample selected from an adjusted importance distribution based on the updated performance model.

In a further embodiment, a system is disclosed that includes a means to store instructions and a means to execute the instructions to cause the system to perform multiple Monte Carlo simulations for an integrated circuit using a first plurality of samples and to obtain a performance model of the integrated circuit based on a result of the Monte Carlo simulations. The means to execute the instructions also executes the instructions to cause the system to determine a failure rate and a confidence level of the failure rate for the integrated circuit with the performance model, and to determine an importance distribution based on the failure rate for the first plurality of samples, wherein the importance distribution is indicative of a probability that a sample value for the integrated circuit will fail the Monte Carlo simulation. The means to execute the instructions also executes the instructions to select a second plurality of samples based on the importance distribution, to perform a second set of Monte Carlo simulations using the second plurality of samples to reduce the confidence interval of the failure rate, and when the confidence interval of the failure rate is larger than a pre-determined value, to obtain an updated performance model and to perform new Monte Carlo simulations with a new sample selected from an adjusted importance distribution based on the updated performance model.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

Figure 1:
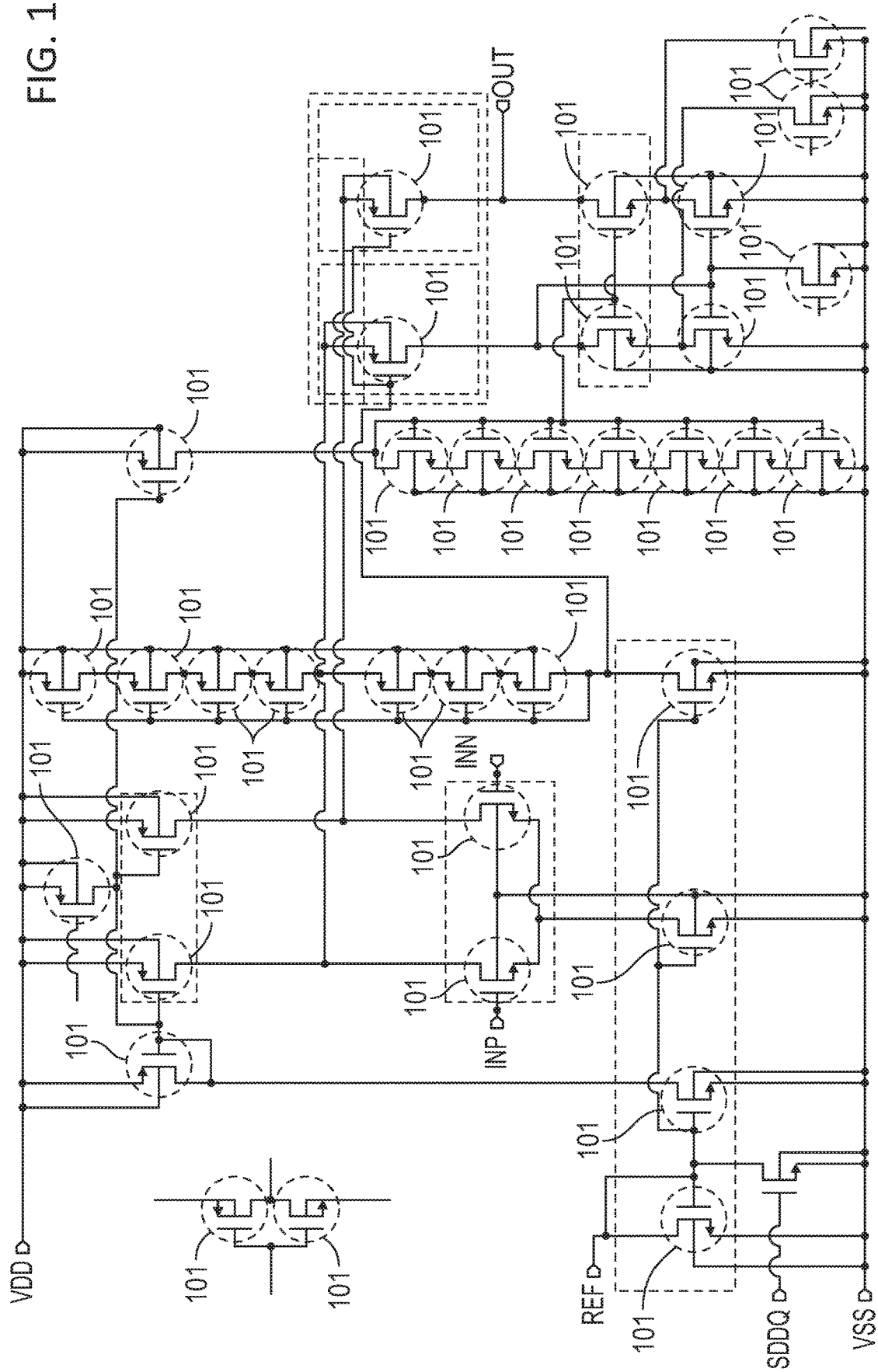
FIG. 1 illustrates a schematic of an IC, according to some embodiments.

In the figures, elements and steps denoted by the same or similar reference numerals are associated with the same or similar elements and steps, unless indicated otherwise. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and descriptions are to be regarded as illustrative in nature and not restrictive.

General Overview

The disclosed system provides a method for estimating a failure rate of an IC design using a limited number of MC simulations to reduce computational costs and turn-around time for modeling and simulating an IC design. While some embodiments described herein make explicit reference to MC simulations, embodiments consistent with the present disclosure may include other types of IC simulation techniques, not limited to MC simulations. Accordingly, some embodiments may apply systems and steps as disclosed herein using pseudo Monte Carlo simulations, or quasi Monte Carlo simulations, among other types of simulations. In a quasi Monte Carlo simulation, low-discrepancy sequences of samples are used (e.g., quasi random, or sub-random, sequence: Halton sequence, Sobol sequence, and the like).

The disclosed system addresses a technical problem tied to computer technology and arising in the realm of computer networks, namely the technical problem of accurately finding the failure rate of a high yield IC design. The disclosed system solves this problem by finding an importance distribution in an iterative process wherein samples are selected according to an increased probability of IC failure. Embodiments consistent with the present disclosure also provide a method to evaluate a normalizing constant for the importance distribution that accelerates the convergence of the iterative process.

Embodiments as disclosed herein provide a solution to the above technical problem by explicitly separating an initial sampling stage from a probabilistic sampling stage for MC simulations of a high-yield IC. The initial sampling stage includes building a performance model using standard MC samples. For a high yield IC, setting failures are rare, and so an estimation of a failure rate is not expected to be accurate. In the probabilistic sample stage, embodiments as disclosed herein provide more samples around the failure region of the IC to obtain an accurate failure rate (e.g., with a narrower confidence interval). When the confidence interval is not good enough, some embodiments include updating the performance model of the IC. The model updating step may occur over multiple iteration cycles.

Embodiments as disclosed herein greatly enhance the performance of a computer by reducing the computational burden and processing time of performing MC simulations. Further, embodiments as disclosed herein enhance the performance of a computer by providing an intuitive display of results, enabling a user to more easily grasp the quality and yield of an IC design, thereby reducing substantially design turnaround time.

Some embodiments include evaluating the performance of the IC by including multiple outputs (e.g., gain, bandwidth, power, latency, bit-error-rate and the like) in the MC simulation of the IC. Accordingly, an aggregated failure rate that includes different performance metrics can be determined. In such configurations, a performance model can be established for a first output, and the model refined sequentially for each of the different outputs, until an optimal performance model may accurately determine a failure rate of the IC with an enhanced confidence interval (e.g., a lower interval).

More generally, some embodiments include a sample selection service that a designer may use to scan a parameter space of random variables and efficiently find areas or "corners" that represent values of interest in the performance of an IC without a detailed understanding of all algorithm details.

A large IC design contains several thousands (e.g., 10K) to millions (e.g., 10M) of replicated unit circuits, e.g., static random access (SRAM) cells, delay flip-flop (DFF) cells, and the like. A rare failure event of a unit circuit may induce a not-so-rare failure for the entire system. For example, the failure rate of a 1 Mb SRAM system may be up to 63% when an SRAM cell failure rate is only one in a million operations ($10^{-6}$). The failure rate of an IC is typically small (e.g., $10^{-7} \sim 10^{-5}$), yet, however small, it may be relevant to the performance of a system at large, at a more significant scale. Accordingly, an efficient failure rate for an IC design is highly desired. Embodiments as disclosed herein include a high yield estimation method where samples are probabilistically selected with a bias according to an importance distribution, wherein the parameter space is probed in regions where IC failure is expected. An accurate account for the true weight of the "failure" region in parameter space is provided herein. In some embodiments, the importance distribution has a maximum value at a point in the parameter space at the border between a fail/no fail value of an IC parameter. Thus, biasing sample selection with the importance distribution provides samples that are likely to render an IC failure even for a high yield IC design. Keeping an accurate weighting factor for the importance distribution enables an accurate account of the failure sample, for statistical purposes. The importance distribution converges into an optimal distribution as the response surface model becomes more accurate.

Embodiments as disclosed herein provide steps that iteratively improve the estimation accuracy of the failure rate of a high-yield IC as more samples are generated and the response surface model is updated.

FIG. 1 illustrates a schematic of an IC design according to some embodiments. IC design 100 may include a netlist having a plurality of circuit components 101. Without limitation, IC design 100 may include an operational amplifier including metal-oxide-semiconductor field effect transistor (MOSFET) as circuit components 101. In general, components 101 may include N-type MOS (NMOS) transistors, P-type MOS transistors (PMOS), resistors, capacitors, inductors, and the like. Some of the specifications that may be relevant for IC design 100 may include, without limitation, an operational current, a unit gain frequency (UGF), a gain value (which may be a function of frequency and/or load), a random offset (e.g., voltage turn-on), an operating bandwidth, a turn-on voltage, and a power consumption. Accordingly, a user may be interested in modeling IC design 100 according to the highest current that the design may draw, the lowest UGF that it may provide, lowest gain, and the largest random offset that may result under a wide range of operational configurations.

For each component 101, the foundry may provide a set of random variables and a model that predicts values of performance parameters as a function of the random variables (also referred to as "process variables" and "mismatch variables"). The foundry may further provide a statistical distribution (e.g., a normal distribution, a Poisson distribution, and the like) for each of the random variables, including a mean value and a standard deviation, targeting performance parameters of circuit component 101 (e.g., a threshold voltage for a transistor, $V_{th}$). Such information is provided by the foundry in the form of a process development kit (PDK), which is a library including text files that may express, e.g., the threshold voltage for an NMOS transistor, $m_1$, $V_{th}(m_1)$ as:

$$V_{th}(m_1) = 0.3 + 0.01 \cdot x_1 + 0.03 \, x_2 + 0.02 \cdot x_3 \quad (1.1)$$

where $x_1$, $x_2$, and $x_3$ are random variables associated with NMOS transistor $m_1$. For statistical PDKs, the random variables $(x_1, x_2, \ldots x_M)$ are typically modeled as a Normal distribution with fixed mean, $\mu_i$, and standard deviation, $\sigma_i$:

$$x_i \sim N(\mu_i, \sigma_i^2) \quad (1.2)$$

An expression like in Eqs. 1.1 and 1.2 is determined after performing a large number of experiments on multiple CMOS transistors fabricated by the foundry. In general, each circuit component 101 may have a number of random variables, $x_j$, associated with it, and each operational value may be associated to the random variables, $x_j$, by an expression similar to Eqs. 1.1 and 1.2. In some embodiments, the number of random variables and the expression for the operational values in Eqs. 1.1 and 1.2 may depend on the type of circuit component being considered (e.g., NMOS transistor, PMOS transistor, resistor, and the like). More generally, the set of random variables $x_1$, $x_2$, and $x_3$ may be designated by a vector, x, such as $x=(x_1, x_2, x_3)$. Hereinafter, reference to a specific collection, j, of the multiple values for all random variables in the PDK will be made as "sample vector $\mathbf{x}_j$" (e.g., with a vector notation in bold).

Further, in some embodiments, expressions such as Eqs. 1.1 and 1.2 may be found in the PDK for all operational parameters of components 101, such that an MC simulation can be carried out for the entire IC design 100 using selected values for random variables $(x_1, x_2, \ldots x_M)$. Accordingly, an output, y, may be found (e.g., a gain, g, a bandwidth, an operational power, of an operational amplifier, a bit error rate, and the like in circuit 100), which is associated to the selected values:

$$y(x) = y(x_1, x_2, \ldots x_m) \quad (1.3)$$

Each of components 101 may be described by size features that have a direct impact on the component performance and an overall impact on the performance of the IC design. For example, some of these parameters (e.g., in the case of a MOSFET) may include an area, a channel width, or a channel length. The user configures IC design 100 to satisfy desired specification targets, which may be defined by the user according to an application intended for IC design 100. To estimate a foundry yield for IC design 100, a user may include random variables $x_j$, constrained by expressions such as Eqs. 1.1, 1.2 and 1.3 in methods as disclosed herein, perform an IC simulation, and determine whether or not the output parameter, $y(x)$, satisfies a performance criterion defined by a target value, $y_t$ (e.g., $y_t < y$, $y < y_t$, and the like).

Accordingly, it is desirable to know a statistical distribution, e.g., a probability density function (PDF) to determine the manufacturing yield for the specific IC design given a certain value of a target value, $y_t$, for output parameter, y. In some embodiments, the statistical distribution may be a cumulative distribution function (CDF) which is an integral of the PDF over the target value $y_t$.

For high yield specifications, given a distribution of random samples, $\{x\}_i$, it is expected that most, if not all, of the output parameters simulated under MC, $\{y(x)\}_i$, will pass the performance criterion, thereby hindering an accurate yield estimation for the IC design under such specifications, unless a large number of MC samples $\{x\}_i$ are simulated.

Further, embodiments disclosed herein provide a visualization of the relationship between manufacturing yield and a value for a selected specification. Thus, a user may clearly identify target specification values, production costs, and IC design turnaround, as desired.

Figure 2:
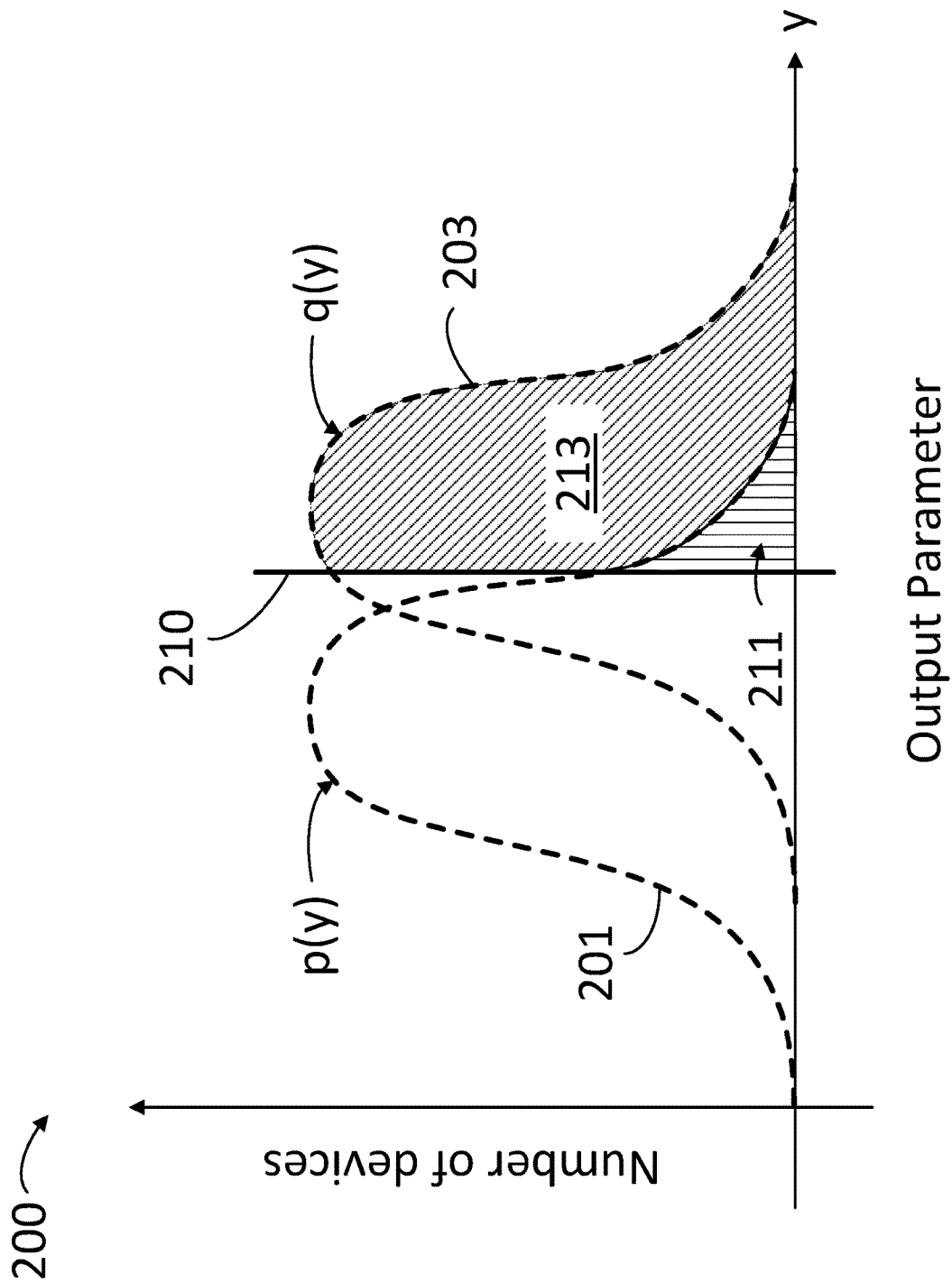
FIG. 2 illustrates a performance distribution and an importance distribution for a random variable to prepare samples in an MC simulation for an IC, according to some embodiments.

FIG. 2 illustrates a chart 200 including performance distribution 201 ("unbiased") and an importance distribution 203 ("biased") for an output parameter, y, resulting from a random variable, x, to prepare samples in an MC simulation for an IC, according to some embodiments. An MC method may be configured to randomly sample the performance distribution p(x) and count number of failed samples as:

$$P^{MC} = \frac{1}{N}\sum_{i=1}^{N} I(x_i) = \frac{N_{fail}}{N} \qquad (2.1)$$

Where $I(x_i)$ is a fail indicator function, which takes a value of '0,' when an IC simulation over sample x passes a performance threshold or test, and a value of '1,' when the IC simulation fails the performance threshold or test. The IC design may be such that an output y(x) fails a performance test for values of random variable, x, larger than a threshold value 210 ($y_t$). A failure boundary that corresponds to threshold value 210 for random variable, x, is generally not known a priori. However, for high-yield IC designs, the area 211 under performance distribution 201 beyond threshold value 210 (e.g., the failure region in parameter space) may be very small, compared to the total area under performance distribution 201 (which is equal to '1'). Millions or billions of simulations may be simulated in order to obtain an accurate failure rate using Eq. 2.1. Embodiments as disclosed herein dramatically reduce the number of MC samples simulated for high yield estimation of IC performance.

In some embodiments, importance distribution 203, q(x), may have a greater relative area 213 beyond threshold value 210. Accordingly, in some embodiments, an MC sampling is biased according to importance distribution 203 so that more failed samples are simulated:

$$P^{IS} = \frac{1}{N}\sum_{i=1}^{N} w(x_i) \cdot I(x_i) \qquad (2.2)$$

$$w(x_i) = \frac{p(x_i)}{q(x_i)} \qquad (2.3)$$

Eqs. 2.2 and 2.3 indicate that the fail indicator $I(x_i)$ of a sample, $x_i$, that renders a failed IC performance, may be weighted as a ratio of the unbiased sample distribution p(x) to the biased importance distribution q(x), to render an accurate account for the low value of area 211.

Embodiments as disclosed herein provide steps to select the appropriate importance distribution 203, and accurately estimate the ratio p(x)/q(x) (cf. Eqs. 2.2 and 2.3). So, for example, if the exact profile of distribution q(x) is known, then an MC sampling technique simply selects samples x weighted according to q(x). Because q(x) is biased toward IC failure, it is more likely that the MC simulation will result on a failure (I(x)=1). However, the value of that fail is adjusted by the (expectedly small) value p(x)/q(x) to account for the bias towards failure.

Figure 3:
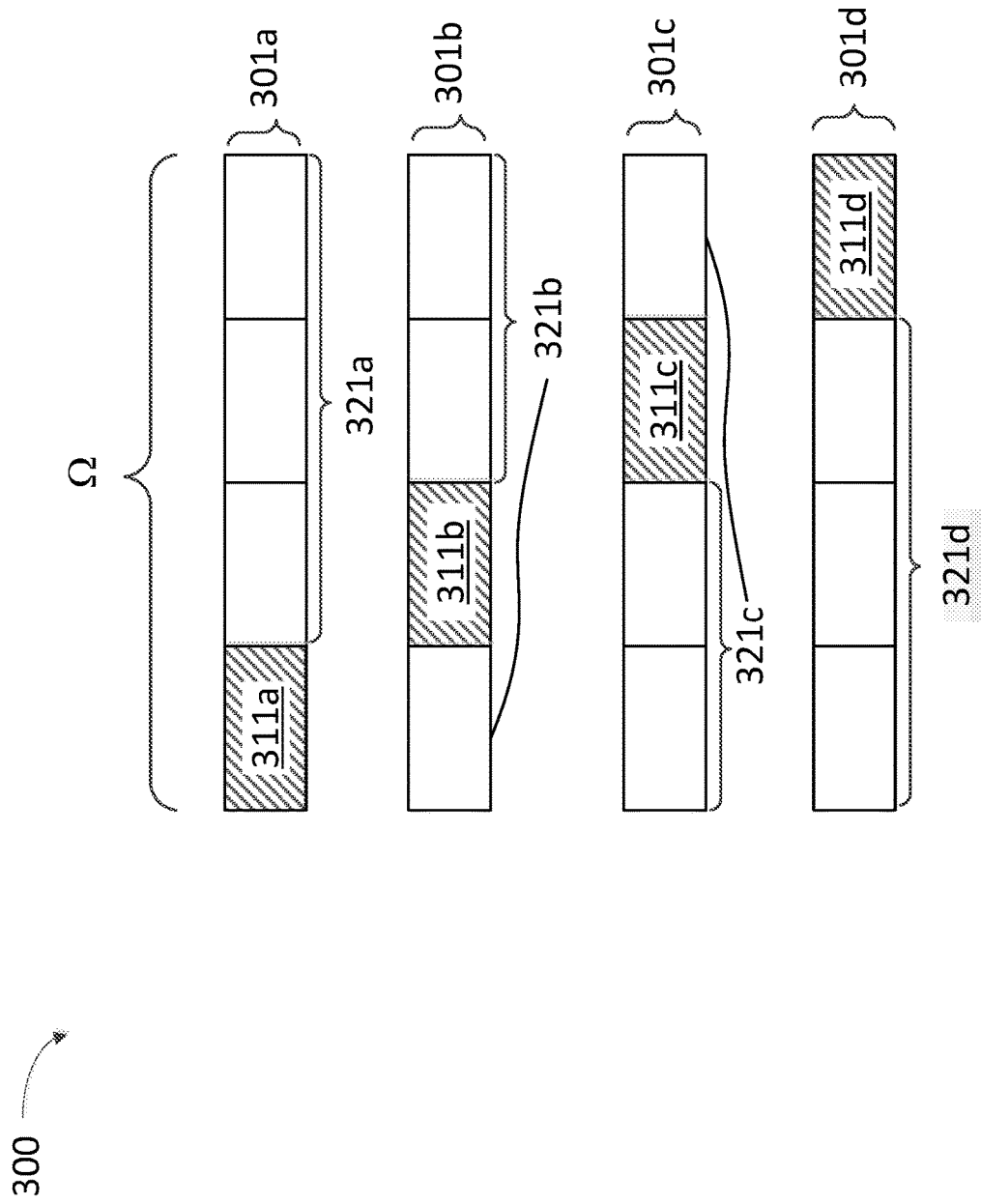
FIG. 3 is a block diagram illustrating a cross-validation scheme for model selection of a set of specifications in an IC, according to some embodiments.

FIG. 3 is a block diagram illustrating a cross-validation 300 for model selection of a set of specifications in an IC, according to some embodiments. Cross-validation 300 generates an error standard deviation, σ, for each of the one or more circuit specification models, $f$, (e.g., gain, g, cf. Eq. 1.3). Accordingly, cross-validation 300 is performed when at least a first model $f$ is obtained for estimating an output value (e.g., $V_{th}$ in Eq. 1.1).

A universe of data samples, Ω, is partitioned into F-folds (F=4 in cross-validation 300, without loss of generality). The F-folds are processed in F different simulation runs 301a, 301b, 301c, and 301d (hereinafter collectively referred to as "simulation runs 301"). At least one of the F-folds in each of simulation runs 301 is selected as a standard deviation fold 311a, 311b, 311c, and 311d (hereinafter collectively referred to as "standard deviation folds 311"). Standard deviation folds 311 are used to determine the error standard deviation, $\sigma_i$, for each run. The remaining F−1 folds in each of simulation runs 301 are model fitting folds 321a, 321b, 321c, and 321d (hereinafter, collectively referred to as "model fitting folds 321"). The model $f$ is fitted using model fitting folds 321 for each run. In some embodiments, the sample universe Ω is evenly divided into the F-folds, meaning that standard deviation folds 311 and model fitting folds 321 have the same, or almost the same size.

In some embodiments, each of the F-folds of the sample universe Ω contains a different set of samples obtained by an MC selection of values for the random variables in a sample vector x.

More generally, assuming multiple output parameters, $y_i$ (e.g., g, in Eq. 1.3, among others such as bandwidth, operational power, bit-error-rate, and the like), each sample, $x_j$, from the sample universe, Ω, is simulated once, and an error $e_{ij}$ is obtained as:

$$e_{ij} = y_{ij,actual} - y_{ij,predicted} \qquad (3.1)$$

The error standard deviation, $\sigma_i$, is obtained from:

$$\sigma_i = \sqrt{\frac{1}{N} \cdot \sum_{j=1}^{N} e_{ij}^2} \qquad (3.2)$$

where N is the size of the sample universe, Ω. Note that in the above computation, the N values $e_{ij}$ in the sample universe Ω are divided into four different models for the same circuit specification. Each of the four different models is determined by a fit performed by model fitting folds 321. The specific number of folds, F, and the size of each fold (e.g., the total number of samples in the sample universe Ω), is determined by the user according to the computational task at hand. For example, for better accuracy for error estimation, more folds F, each having fewer samples, may be desirable (albeit at the cost of a longer run time).

The model selection may include using different models including multiple basis functions of sample vector x having multiple individual components $x_j$. For example, some of the models may include "orthogonal matching pursuit" (OMP) with linear basis functions as in the following mathematical expression:

$$y_i = \sum_{j=1}^{M} a_{ij} \cdot x_j \qquad (3.3)$$

In some embodiments, the model selection is an OMP with linear and quadratic basis functions, as in:

$$y_i = \sum_{j=1}^{M} a_{ij} \cdot x_j + \sum_{j=1}^{M} b_{ij} \cdot x_j^2 \qquad (3.4)$$

In yet other embodiments, the model selection may include OMP with linear, quadratic basis functions including cross terms, as in:

$$y_i = \sum_{j=1}^{M} a_{ij} \cdot x_j + \sum_{j=1}^{M} b_{ij} \cdot x_j^2 + \sum_{j<k} d_{ijk} \cdot x_j \cdot x_k \qquad (3.5)$$

Note that indices j and k (e.g., $x_j$ and $x_k$) in Eqs. 3.4 and 3.5 are associated with individual random variables $x_i$ and $x_j$ in sample vector, x. Cross-validation 300 provides a test for the accuracy of each of the models used (e.g., the value of $\sigma_t$ in Eq. 3.2). Therefore, a user may choose the model that best satisfies an accuracy consideration and a computational efficiency consideration. In some embodiments, multiple MC simulations may be performed to satisfy the accuracy consideration. Thus, an accurate response surface model, $f$, can be built for any one of multiple output parameters, as:

$$y = f(x) + \varepsilon \qquad (3.6)$$

wherein $\varepsilon$ is a random error term. In some embodiments, $\varepsilon$ is modeled by a Normal distribution as:

$$\varepsilon = N(0, \sigma^2) \qquad (3.7)$$

wherein the standard deviation, $\sigma$, may be obtained as in Eq. 3.2 (e.g., averaging the standard deviation folds 311, or selecting the largest, for all standard deviation folds). Accordingly, the output parameter value, y, may follow a Normal distribution given by:

$$p(x_i) = N(f(x_i), \sigma^2) \qquad (3.8)$$

For any output parameter, there is a specification that determines a pass/fail condition of the IC. The specification can be one of the following:

$$y > t_1;\ y < t_2;\ t_1 < y < t_2 \qquad (3.9)$$

Based on Eqs. 3.8 and 3.9, a failure probability (FP(x)) can be estimated as:

$y > t_1$ $$FP(x_i) = \frac{1}{2}\left(1 + \mathrm{erf}\left(\frac{t_1 - f(x_i)}{\sigma\sqrt{2}}\right)\right) \qquad (3.10.1)$$

$y < t_2$ $$FP(x_i) = \frac{1}{2}\left(1 + \mathrm{erf}\left(\frac{f(x_i) - t_2}{\sigma\sqrt{2}}\right)\right) \qquad (3.10.2)$$

$t_1 < y < t_2$ $$FP(x_i) = \frac{1}{2}\left(1 + \mathrm{erf}\left(\frac{t_1 - f(x_i)}{\sigma\sqrt{2}}\right)\right) + \frac{1}{2}\left(1 + \mathrm{erf}\left(\frac{f(x_i) - t_2}{\sigma\sqrt{2}}\right)\right) \qquad (3.10.3)$$

With the functions, p(x) and FP(x) in Eqs. 3.8 and 3.10, obtained from one or more iterations of MC simulations of the IC, embodiments as disclosed herein may determine an accurate value of a failure rate for a high yield IC. Accordingly, methods as disclosed herein provide steps for selecting samples in each iteration of the MC simulation to quickly arrive to an accurate value for the failure rate of the IC.

Figure 4:
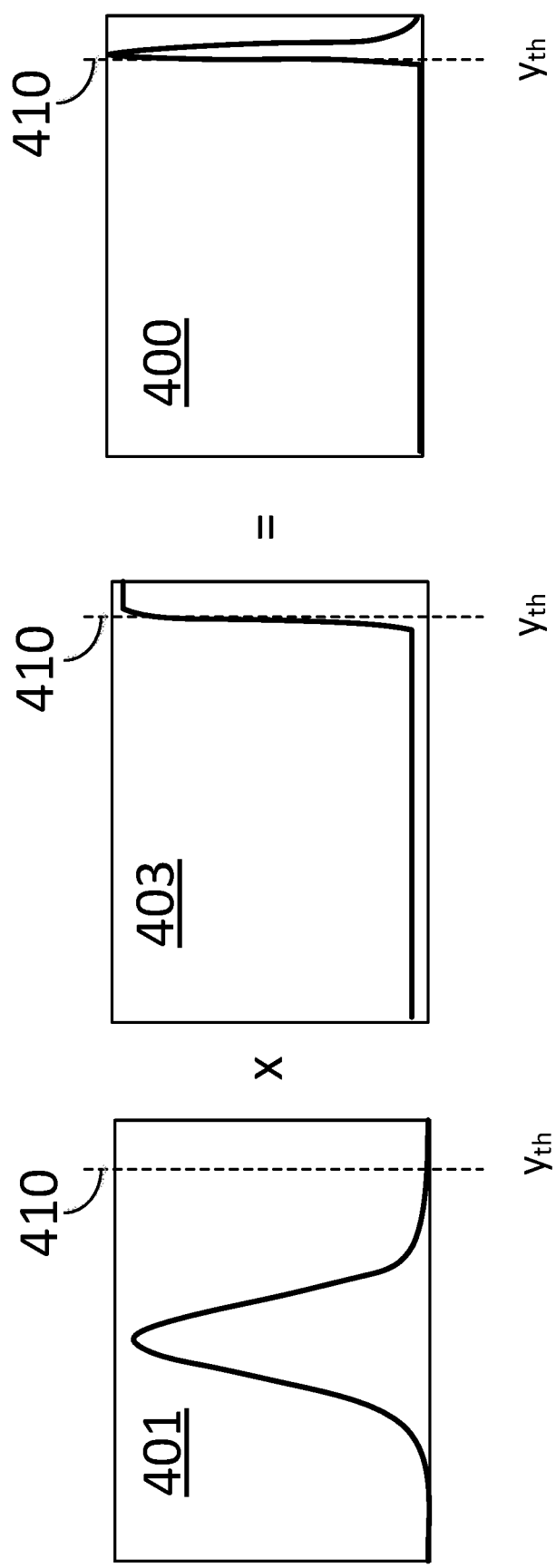
FIG. 4 illustrates an importance distribution to perform a sample selection in an MC simulation for evaluating an IC, according to some embodiments.

FIG. 4 illustrates an importance distribution 400 (q(x)) to perform a sample selection in an MC simulation for evaluating an IC, according to some embodiments. In some embodiments, an optimal importance distribution, q(x) 400, may be given by an exact sample distribution, p(x) 401, and an exact failure indicator function I(x) 403, (cf. Eqs. 2.2 and 2.3) as:

$$q_{opt}(x) = \frac{1}{c_{opt}} p(x) \cdot I(x) \qquad (4.1)$$

The value, copy, is a normalizing constant, and:

$$c_{opt} = \int p(x) \cdot I(x) dx \qquad (4.2)$$

If the exact failure indicator function $I(x)$ is known, then the importance sampling will converge with only one sample, since the value:

$$c_{opt} = \frac{p(x_i)}{q(x_i)} \cdot I(x_i) \qquad (4.3)$$

is a constant. However, in most cases, p(x) 401 and I(x) 403 are not known, a priori. In some embodiments, importance distribution 400 may be approximated using p(x) and FP(x) determined with MC simulations (cf. Eqs. 3.8 and 3.10), as:

$$q(x) = \frac{1}{c} p(x) \cdot FP(x) \qquad (4.4)$$

Eq. 4.4 uses the function FP(x) as a smooth approximation of the exact indicator function I(x). The normalization constant, c, is determined so that (cf. Eq. 4.2):

$$\int q(x) dx = 1 \qquad (4.5)$$

FP(x) converges into I(x) as the model error a becomes smaller (cf. Eq. 3.2). In some embodiments, assuming an exact model ($\sigma$=0), then FP(x)=I(x), and importance sampling will converge to the true answer with a single data value, x. An exact failure indication function I(x) may be a step function: I(x)=0 for y<$y_t$ (IC pass), and I(x)=1 (IC fail) for y≥$y_t$ (cf. Eq. 3.9). In some embodiments, an exact failure indication function I(x) may have some variance around a threshold value $y_t$, e.g., I(x)>>0.5 for y>$y_t$, and I(x)<<0.5 for y<$y_t$. In practice, the exact failure indicator function I(x) 403 is not known a priori, and FP(x) 403 may be a good approximation.

Sample distribution p(x) 401 may provide a failed IC when y≥$y_t$. However, the value y may belong to a high sigma region of p(x) 401, and therefore it may take a large number of sampling points to determine an accurate value of the fail rate. By contrast, $y_t$ belongs to a lower sigma region of q(x) 400, and therefore q(x) 400 offers a faster approach to select values of y>$y_t$ that provide sufficient failed samples for an accurate determination of the IC failure rate, even for a high yield IC design.

In some embodiments, importance distribution q(x) 400 is used to select a sample vector, x, to use for a new iteration of the MC simulation of the IC performance. Accordingly, when q(x) 400 is a good approximation to the true importance distributions. In some embodiments, the value of y may be obtained through a model (cf. Eqs. 1.3 and 3.6), or through an IC simulation of the circuit. The sampling selection leads to sample values resulting in sufficient failure hits so that an accurate failure rate may be estimated without having to perform a large number of MC samples using the unbiased sample distribution p(x) 401. Steps to select the samples for a new MC iteration based on an approximate distribution q(x) 400 are shown as follows.

Figure 5:
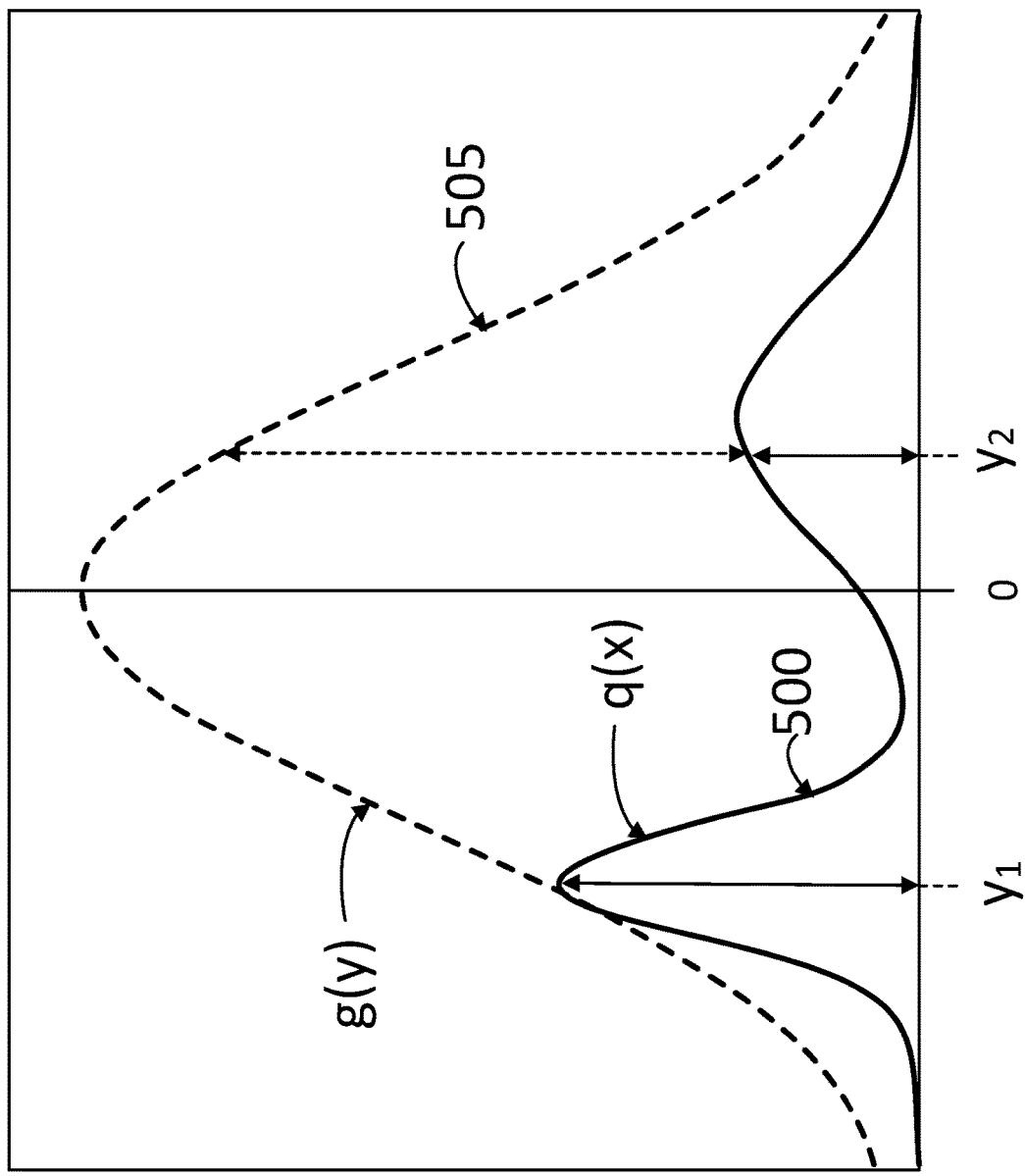
FIG. 5 illustrates an auxiliary distribution in a rejection sampling scheme used for finding a failure rate of an IC, according to some embodiments.

FIG. 5 illustrates an auxiliary distribution g(x) 505 in a rejection sampling scheme used for finding a failure rate of an IC, according to some embodiments. In some embodiments, when an importance distribution q(x) 500 is determined (e.g. q(x) 400), an auxiliary function g(x) 505 may be selected such as:

$$q(x) \le R \cdot g(x) \quad (5.1)$$

for any x. In Eq. (5.1), the value R is a value larger than, or equal to '1.'

A sample value, x, is selected for a further MC iteration with a probability equal to the ratio of q(x) to R·g(x). For example, for any vector, x, a random number 0<U<1 is selected, and if:

$$U \le \frac{q(x)}{R \cdot g(x)} \quad (5.2)$$

Then vector x is used as a sample in the next MC iteration (wherein y=y(x), cf. Eq. 1.3). According to the above, a sample, x, such that $y(x)=y_1$ will be most certainly selected (when R=1, see figure), whereas a sample, x, such that $y(x)=y_2$ will be selected with probability ~0.3. This is consistent with embodiments wherein q(x) is built to indicate how relevant the sample x is within the border region of failed/pass IC performance.

The proposed importance distribution (Eq. 4.4) satisfies:

$$q(x) \le \frac{1}{c} \cdot p(x) \quad (5.3)$$

because 0<FP(x)<1.

Accordingly, in some embodiments, the auxiliary function g(x) 505 can be selected as p(x) with R=1/c. After sampling for p(x), sample 'x' is selected with a probability given by the ratio:

$$FP(x) = \frac{q(x)}{\frac{1}{c} \cdot p(x)} \quad (5.4)$$

wherein the normalization constant, c, is calculated by (cf. Eq. 4.2):

$$c = \int p(x) \cdot FP(x) dx \quad (5.5)$$

In some embodiments, when M samples are used for a Monte Carlo simulation to find p(x) (cf. Eq. 3.8), c can be estimated by:

$$c = \frac{1}{M} \sum_{i=1}^{M} FP(x_i) \quad (5.6)$$

wherein $FP(x_i)$ may be determined using the results of the model on the Monte Carlo samples (cf. Eqs. 3.10). In some embodiments, no further MC simulations are necessary to estimate FP as in Eq. 5.6. Instead, any number of random samples, $x_i$, may be generated for Eq. 5.6, and the values $y_i$ may be obtained through the model for $f$ (cf. Eqs. 3.5 through 3.10).

Some embodiments include a large number of samples, M, for calculating c in Eq. 5.6 compared to rejection sampling (cf. Eqs. 5.2 and 5.4) because the value of $FP(x_i)$ may be obtained using Eqs. 3.10 rather than running a full IC simulation.

In some embodiments, when N simulations are executed, a failure rate ($P_f$, probability that each execution returned a failed IC) is estimated by:

$$P_f = \frac{1}{N} \sum_{i=1}^{N} \frac{p(x_i)}{q(x_i)} \cdot I(x_i) \quad (5.7)$$

$$= \frac{1}{N} \sum_{i=1}^{N} \frac{p(x_i)}{\frac{1}{c} p(x_i) FP(x_i)} \cdot I(x_i) \quad (5.8)$$

$$= \frac{1}{N} \sum_{i=1}^{N} \frac{c}{FP(x_i)} \cdot I(x_i) \quad (5.9)$$

wherein the value of c is estimated using Eq. 5.6, and $I(x_i)=1$, if $y_i$ (as obtained through simulation, rather than Eq. 3.6) fails, or $I(x_i)=0$, if $y_i$ passes.

Intuitive explanation: select samples with probability FP(x), and if we find a fail ($I(x_i)=1$), it is counted as c/FP(x) fails.

Figure 6:
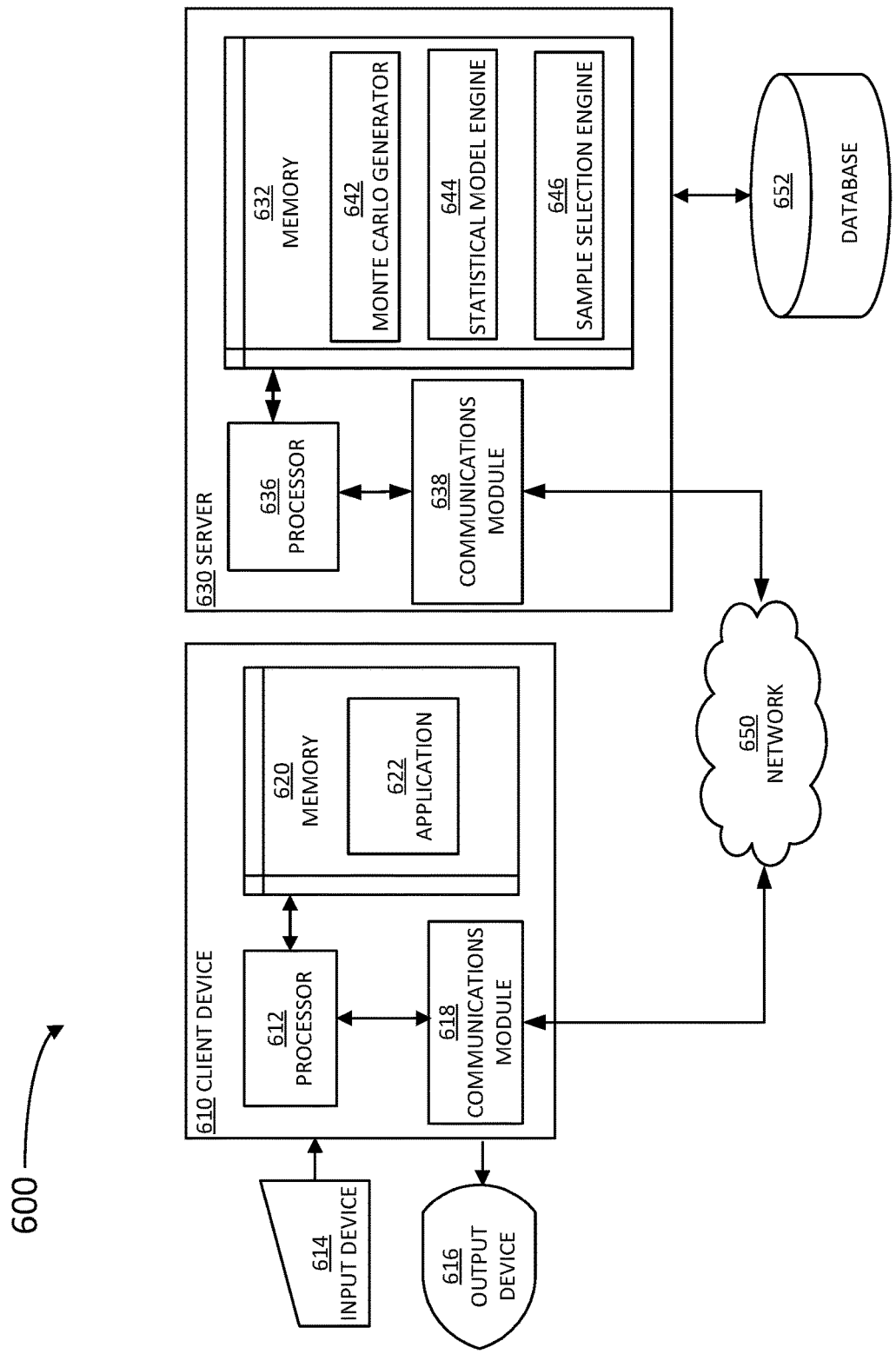
FIG. 6 illustrates an example architecture suitable for determining a failure rate in a high-yield IC design, according to some embodiments.

FIG. 6 illustrates an example architecture 600 suitable for determining a failure rate in a high-yield IC design, according to some embodiments. A client device 610 may include a processor 612 and a communications module 618 that enables client device 610 to communicate with other devices via a network 650. Client device 610 also includes a memory 620 for storing instructions which, when executed by processor 612, cause client device 610 to perform at least some of the steps in methods described herein. In some embodiments, the instructions stored in memory 620 may include an application 622 hosted by an external server (e.g., server 630). In some embodiments, application 622 is configured to provide a sample selection for MC simulations in a high yield IC circuit. Client device 610 may also include accessories as an input device 614 (e.g., a mouse, a pointer, a keyboard, a touchscreen display, a camera, a speaker, and the like) and an output device 616 (e.g., a display, a speaker, a camera, and the like).

Client device 610 may be communicatively coupled with a server 630 via a network 650. Server 630 may include a processor 636 and a communications module 638 to activate information exchanges through network 650 (e.g., with client device 610). Server 630 may also include a memory 632 coupled to processor 636. Memory 632 stores instructions which, when executed by processor 636, cause server 630 to perform at least some of the steps in methods described herein. In some embodiments, memory 632 may include an MC generator 642, a statistical model engine 644, and a sample selection engine 646. Server 630 may include, or be communicatively coupled with, a database 652. Database 652 may include multiple IC configurations, parameters and functions, libraries, and resources collected historically by server 630 for previous IC designs and that may be helpful for MC generator 642, statistical model engine 644, and sample selection engine 646 in solving for a current IC design.

In some embodiments, MC Generator 642 is configured to return a corresponding random number for a given MC iteration. Statistical model engine 644 builds a response surface model based on the training samples as statistical parameter values and output values (cf. Eq. 1.1), and uses the model to select new sample values that render more failed configurations in a high yield IC design. Sample selection engine 646 is configured to handle the flow of application 622, such as what samples to simulate in a subsequent step, based on prior results of an MC simulation. In some embodiments, sample selection engine 646 also determines when the algorithm running on application 622 has reached a satisfactory convergence point, when to stop, or when the number of iterations has reached a threshold and further execution should be avoided.

In some embodiments, a designer using application 622 in client device 610 may not have a direct interaction with, or knowledge of, the steps performed by any one of MC generator 642, statistical model engine 644, or sample selection engine 646.

In some embodiments, application 622 may be partially or completely self-contained within client device 610, including a separate library containing MC generator 642, statistical model engine 644, or sample selection engine 646 in a database directly accessible by, or being part of memory 620, in client device 610. Accordingly, the user may perform some, or all, of the steps in methods consistent with the present disclosure without communicating with the external server through network 650.

Figure 7:
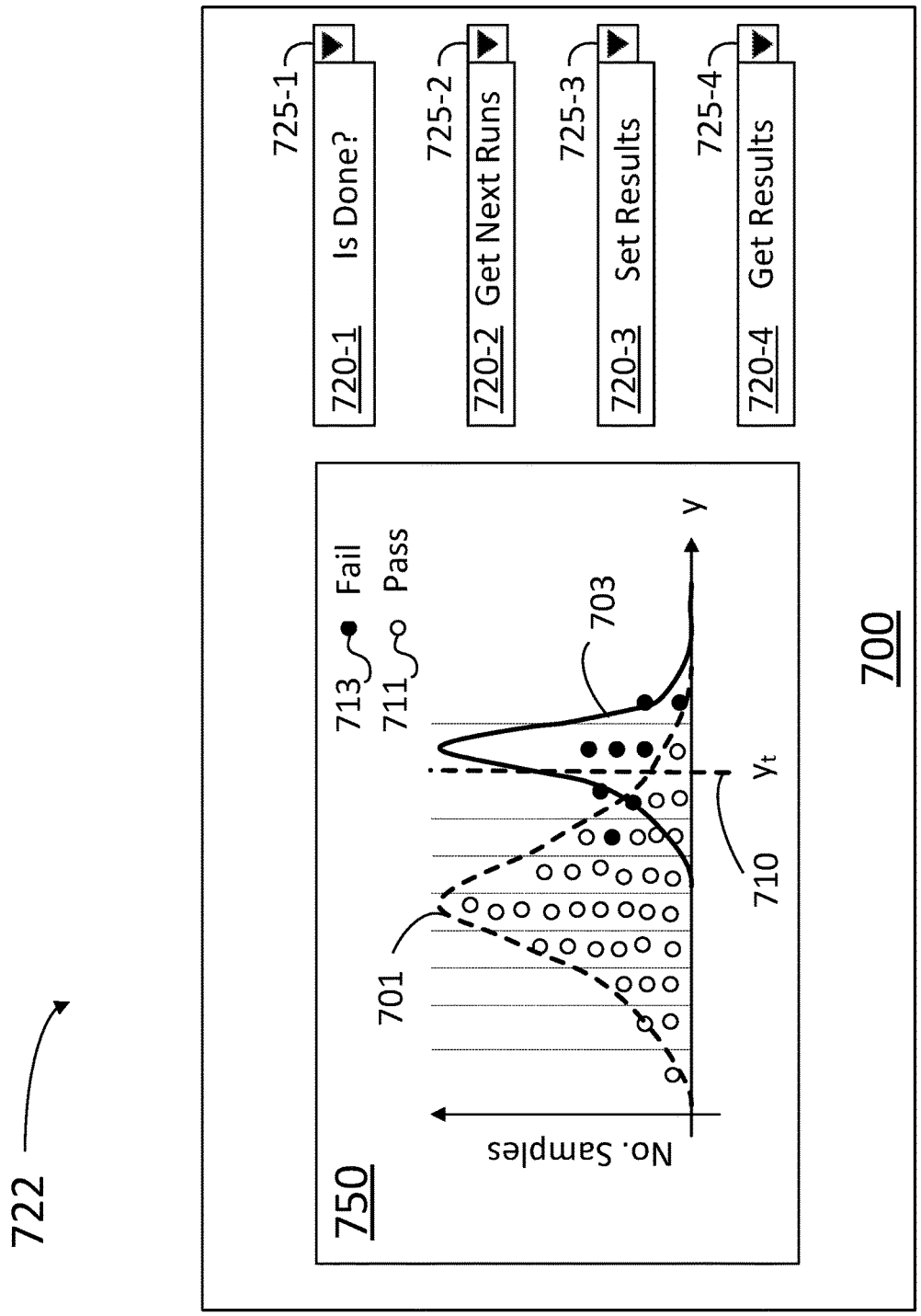
FIG. 7 illustrates a display of a user interface for an application running on a client device to perform a sample selection in an MC simulation for evaluating an IC, according to some embodiments.

FIG. 7 illustrates a display of a user interface 700 for an application 722 running on a client device (e.g., application 622 in client device 610) to perform a sample selection in an MC simulation for evaluating an IC, according to some embodiments. User interface 700 may include a graphic 750 illustrating for the user a result of a given MC simulation of the IC. Graphic 750 may include fail points 713 and pass points 711 in a chart having a performance distribution 701 and an importance distribution 703 that are approximations to a true performance distribution and a true importance distribution (e.g., p(x) 201 and q(x) 203, respectively). Based on the graphic illustration, the user may select a threshold value $y_t$ 710 to form a new importance distribution. In some embodiments, application 722 may recommend to the user a preferred value for threshold value 710, or a shape of importance distribution (e.g., Normal, Lorentzian, Chi-squared, and the like). In any event, the user may select a recommended value, or use an otherwise preferred value, run a new MC calculation, and determine whether the results are satisfactory (e.g., graphic 750 includes more and more fail points 713 with less uncertainty at the boundary between performance distribution 701 and importance distribution 703).

In some embodiments, application 722 may be implemented as a sample selection service for general purposes, other than IC design and simulation. The user of application 722 may have a limited knowledge of the detailed calculations carried out by application 722. Therefore, user interface 700 provides a user-friendly platform for a user or a circuit designer to improve the simulation efficiency and testing of a high-yield IC.

Further, user interface 700 includes input tabs and fields so that the user can easily tweak implementation details of the algorithm without any further adjustments on the user side. Some embodiments are configured to minimize exposure of implementation details to the user. In some embodiments, application 722 includes up to four (4) application programming interfaces 720-1, 720-2, 720-3, and 720-4 (hereinafter, collectively referred to as "APIs 720"). Each of APIs 720 includes a tab 725-1, 725-2, 725-3, and 725-4 (hereinafter, collectively referred to as "tabs 725"), respectively. Each one of tabs 725 may include a pull down menu, a sliding scale, or any other graphic interface for the user to enter, or type, an input into the corresponding API 720. In some embodiments, APIs 720 and tabs 725 may include:

API 720-1 ("isDone") determines whether the algorithm should stop. Accordingly, tab 725-1 may include a "yes" or "no" option.

API 720-2 ("getNextRuns") determines what are the next samples to run. This should automatically consider the number of jobs available. Note that there is no need for the user to distinguish the initial stage and sample selection stage, as the function will automatically switch from returning samples sequentially to probabilistically as the internal algorithm state changes. Tab 725-2 may include a browse option, wherein the user may search in a database for previous sample sets (e.g., database 652), or specific distributions to apply in a new MC run if the IC simulations.

API 720-3 ("setResults") provides simulation results to the algorithm. API 720-3 includes providing to application 722 the values of all performance parameters evaluated during the MC simulation. Tab 725-3 may include a browse option, wherein the user may search and select, within the database, for a file, including the results of the MC simulation of the circuit using a prior sample set.

API 720-4 ("getAlgResult") returns the result of the algorithm once it is finished. Accordingly, tab 725-4 may include a browse option, and a text input field so that the user may select a location in the database and a file name to store the results of the algorithm in the selected location.

From the user perspective, some embodiments may include the following few lines of pseudocode:

```
"mcGen=new MCGenerator( );
alg=new SampleSelectionAlgorithm(mcGen, algConfig);
while (alg->isDone( )
currentRunSequence=alg->getNextRuns( )
currentSimulatedRes=simulate(mcGen, currentRunSequence);
alg->setResults(currentRunSequence, currentSimulatedRes);
return alg->getAlgResult( )"
```

User interface 700 may include the following capabilities: Perform simulation, given an iteration number and MCGenerator. Handle parallel job distribution if multiple iteration numbers are provided. Define output expressions and specifications and provide that as an input to the algorithm.

The user only needs to use two out of the three components in the library: MCGenerator: generate the required random numbers for simulation, and SampleSelectionAlgorithm: indicate which samples to simulate.

Figure 8:
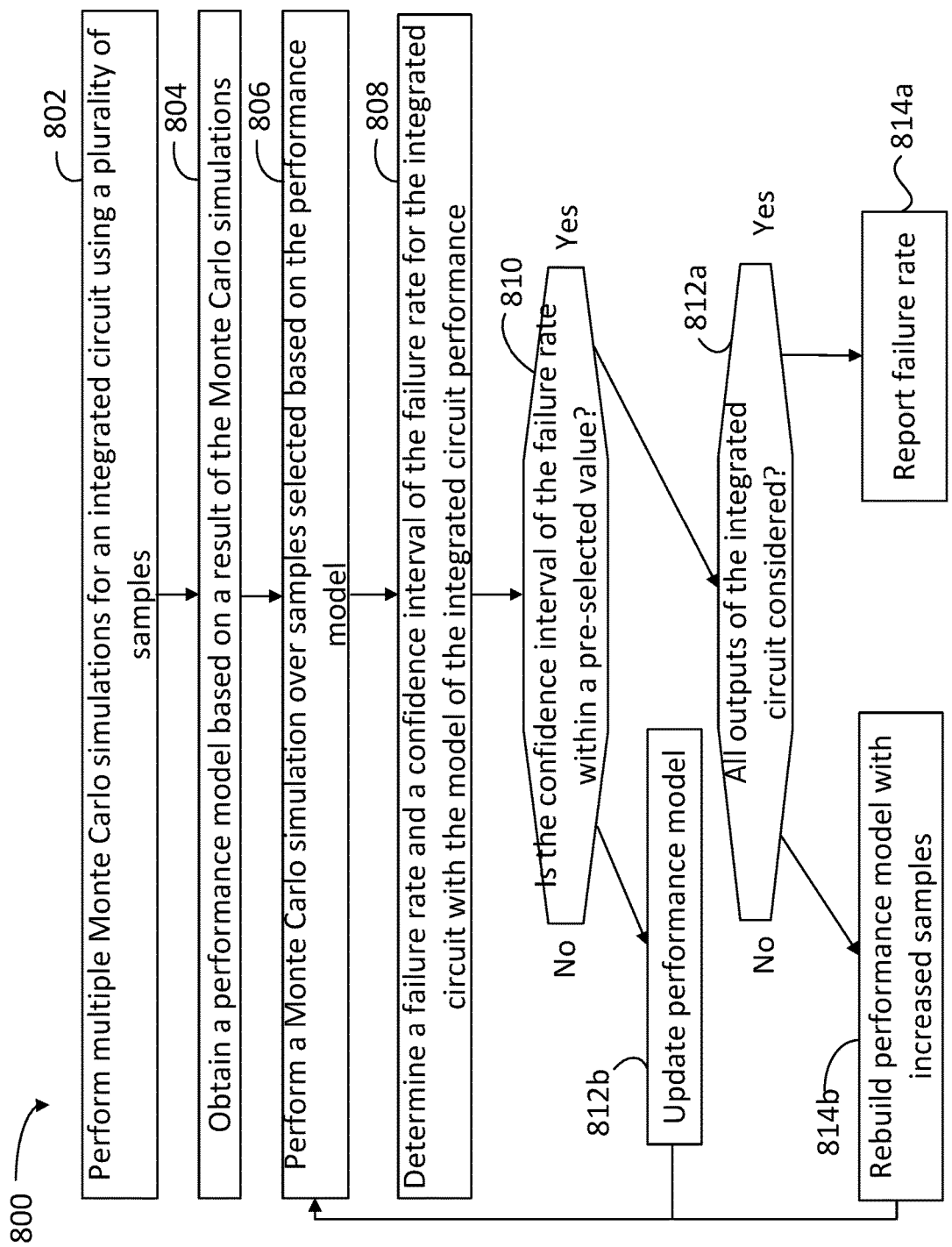
FIG. 8 is a flow chart illustrating steps in a method for determining a failure rate in an IC, according to some embodiments.

FIG. 8 is a flow chart illustrating steps in a method 800 for determining a failure rate in an IC, according to some embodiments. At least some of the steps in method 800 may be performed by a computer having a processor executing commands stored in a memory of the computer. Further, steps as disclosed in method 800 may include retrieving, editing, and/or storing files in a database that is part of, or is communicably coupled to, the computer. Methods consistent with the present disclosure may include at least some, but not all, of the steps illustrated in method 800, performed in a different sequence. Furthermore, methods consistent with the present disclosure may include at least two or more steps as in method 800, performed overlapping in time, or almost simultaneously.

In some embodiments, at least one or more of the steps in method 800 may be performed in a cloud computing environment, wherein a computer may include servers, such as a master server and a slave server. Accordingly, at least some of the steps illustrated in method 800 may be performed in parallel in different processors, following separate computational threads. For example, each of the separate computational threads may be performed by at least one of the slave servers in each of multiple applications and processors dedicated to the specific computational thread.

Step 802 includes performing multiple Monte Carlo simulations for an integrated circuit using a first plurality of samples. In some embodiments, step 802 includes randomly selecting the first plurality of samples. In some embodiments, step 802 includes separating the first plurality of samples into at least a first group and a second group, performing a first subset of Monte Carlo simulations over the first group and maximizing model parameters for the second group, and performing a second subset of Monte Carlo simulations over the second group and maximizing model parameters for the first group.

Step 804 includes obtaining a performance model of the integrated circuit based on a result of the Monte Carlo simulations. In some embodiments, step 804 includes assuming a normal distribution for a performance parameter of the integrated circuit centered on a model value of the integrated circuit obtained from the Monte Carlo simulations, obtaining a variance with a cross-validation of the Monte Carlo simulations, and adjusting a parameter in the model value to reduce the variance. In some embodiments, step 804 includes evaluating, for the integrated circuit, multiple outputs associated with a circuit performance (e.g., gain, bandwidth, operation power, bit-error-rate, and the like), determining a failure rate for each of the outputs, and optimizing the performance model for an output with a highest accuracy to obtain a first optimized model. In some embodiments, step 804 also includes optimizing the first optimized model for an output with a second highest accuracy, and evaluating a compound failure rate and a compound confidence interval for the performance model over the outputs.

$$P_f = \sum_{j=1}^{J} \frac{1}{N_j} \sum_{i=1}^{N_j} v_j(x_{ij}) \cdot \frac{p(x_{ij})}{q(x_{ij})} \cdot I(x_{ij}) \qquad (8.1)$$

Where $v_j(x_{ij})$ is a weight function satisfying:

$$\sum_{j=1}^{J} v_j(x) = 1, \text{ for all } x \qquad (8.2)$$

Many possible weight functions are available to combine multiple runs. In some embodiments, step 804 may include weighting the different outputs with a "balanced heuristic" weighting function, as follows:

$$v_j(x) \propto N_j q_j(x) \qquad (8.3)$$

In some embodiments, step 804 includes determining an importance distribution based on the failure rate for the first plurality of samples, wherein the importance distribution is indicative of a probability that a sample value for the integrated circuit will fail the Monte Carlo simulation. In some embodiments, step 804 also includes using the performance model to bias the failure rate, and finding a normalization constant using a failure rate for the first plurality of samples. Further, in some embodiments step 804 includes selecting a second plurality of samples based on the importance distribution.

Step 806 includes performing a Monte Carlo simulation over a sample selected based on the performance model. In some embodiments, step 806 includes forming an auxiliary distribution that has a higher value than the importance distribution for all values of an output parameter, and selecting a random variable when its value is greater than a ratio of the importance distribution to the auxiliary distribution, evaluated at the random variable.

In some embodiments, step 806 also includes determining a second standard deviation of the performance model based on the Monte Carlo simulations, such that the second standard deviation is lower than a first standard deviation of the performance model associated with the first plurality of samples.

Step 808 includes determining a failure rate and a confidence level of the failure rate for the integrated circuit with the performance model of the integrated circuit performance.

$$\mathrm{Var}(P_f) = \mathrm{Var}\left(\frac{1}{N}\sum_{i=1}^{N} \frac{c \cdot I(x_i)}{FP(x_i)}\right) = \mathrm{Var}\left(\frac{1}{N}\sum_{i=1}^{N} P_{fi}\right) \qquad (8.4)$$

wherein:

$$P_{fi} = \frac{c \cdot I(x_i)}{FP(x_i)} \qquad (8.5)$$

In some embodiments, when samples are generated independently, step 808 includes:

$$\mathrm{Var}(P_f) = \frac{1}{N}\mathrm{Var}(P_{fi}) = \frac{1}{N^2}\sum_{i=1}^{N}\left(\frac{c \cdot I(x_i)}{FP(x_i)} - P_f\right)^2 \qquad (8.6)$$

In some embodiments, step 808 includes calculating a 95% confidence interval based on Var($P_f$), for example:

95% confidence interval=($P_f$−1.96$\sqrt{\mathrm{Var}(P_f)}$,$P_f$+1.96$\sqrt{\mathrm{Var}(P_f)}$)) (8.7)

In some embodiments, step 808 includes a failure rate estimation for multiple outputs:

$$P_f = \frac{1}{N}\sum_{j=1}^{J}\sum_{i=1}^{N_j} \frac{p(x_{ij})}{\sum_{j=1}^{J} \frac{N_j}{N} q_j(x_{ij})} \cdot I(x_{ij}) \qquad (8.8)$$

In some embodiments (cf. Eq. 4.4):

$$q(x) = \frac{1}{c_j} p(x) \cdot FP_j(x) \qquad (8.9)$$

And therefore, step 808 may include:

$$P_f = \frac{1}{N} \sum_{j=1}^{J} \sum_{i=1}^{N_j} \frac{I(x_{ij})}{\sum_{j=1}^{J} \frac{N_j}{N \cdot c_j} FP_j(x_{ij})} \quad (8.10)$$

The confidence interval cannot be accurately estimated analytically because the samples are not truly independent in a multiple run setting.

Still, assuming each sample is independently drawn from a mixture distribution, the confidence interval may be determined to be:

$$\text{Var}(P_f) = \frac{1}{N^2} \sum_{j=1}^{J} \sum_{i=1}^{N_j} \left( \frac{I(x_{ij})}{\sum_{j=1}^{J} \frac{N_j}{N \cdot c_j} FP_j(x_{ij})} - P_f \right)^2 \quad (8.11)$$

The estimate may be empirically corrected based on sample correlation.

Step 810 includes determining whether the confidence interval of the failure rate is within a pre-selected value.

When step 810 determines that the confidence interval of the failure rate is within the pre-selected value, step 812*a* includes determining whether all outputs of the integrated circuit have been considered.

When step 810 determines that the confidence interval of the failure rate is not within the pre-selected value, step 812*b* includes updating the performance model for the selected output parameter and returning to step 806 to perform new Monte Carlo simulations over newly selected samples. The newly selected samples may be obtained from the new importance distribution obtained from the updated performance model. In some embodiments, step 812*b* may include adjusting or modifying at least one or more of the coefficients in the performance model (cf. $a_{ij}$, $b_{ij}$ and $d_{ij}$ in Eqs. 3.3-3.5).

When step 812*a* determines that all outputs of the IC have been considered for the IC, step 814*a* includes reporting an adjusted failure rate based on an improved model of the integrated circuit. In some embodiments, step 814*a* also includes modifying the integrated circuit when the adjusted failure rate is greater than a pre-selected value. In some embodiments, the IC is part of a system on chip and step 814*a* includes estimating a system on chip performance based on the adjusted failure rate.

When step 812*a* determines that all outputs of the IC have not been considered, step 814*b* includes rebuilding the performance model for the remaining outputs of the IC, using the increased number of Monte Carlo simulations available from steps 802 and 806. Accordingly, step 814*b* includes repeating method 800 from step 808, for the remaining outputs of the IC.

Figure 9:
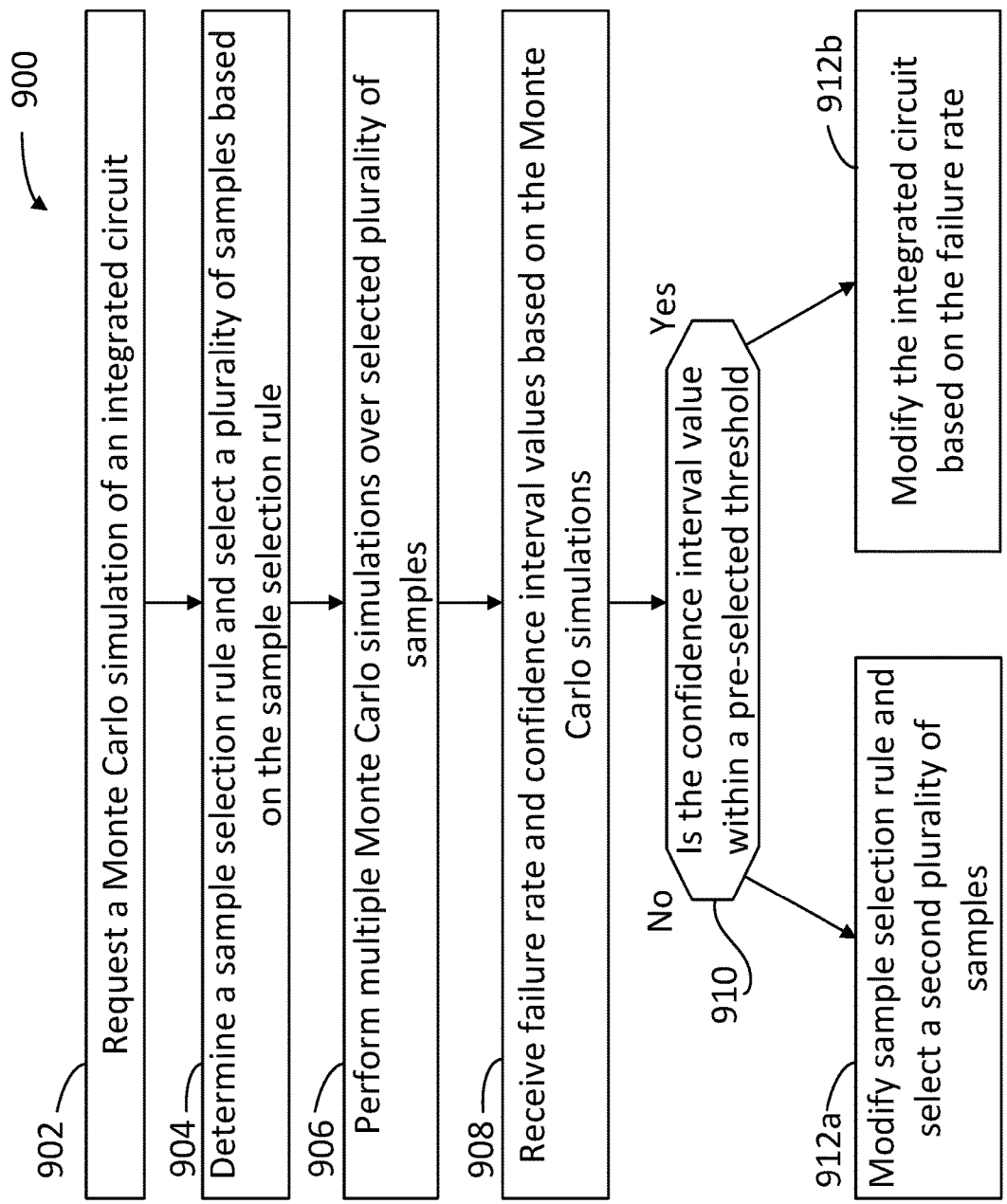
FIG. 9 is a flow chart illustrating steps in a method for determining a failure rate in an MC simulation of an IC, according to some embodiments.

FIG. 9 is a flow chart illustrating steps in a method 900 for determining a failure rate in an MC simulation of an IC, according to some embodiments. At least some of the steps in method 900 may be performed by a computer having a processor executing commands stored in a memory of the computer. Further, steps as disclosed in method 900 may include retrieving, editing, and/or storing files in a database that is part of, or is communicably coupled to, the computer.

Methods consistent with the present disclosure may include at least some, but not all, of the steps illustrated in method 900, performed in a different sequence. Furthermore, methods consistent with the present disclosure may include at least two or more steps as in method 800, performed overlapping in time, or almost simultaneously.

In some embodiments, at least one or more of the steps in method 900 may be performed in a cloud computing environment, wherein a computer may include servers, such as a master server and a slave server. Accordingly, at least some of the steps illustrated in method 900 may be performed in parallel in different processors, following separate computational threads. For example, each of the separate computational threads may be performed by at least one of the slave servers in each of multiple applications and processors dedicated to the specific computational thread.

Step 902 includes requesting a Monte Carlo simulation of an integrated circuit.

Step 904 includes determining a sample selection rule and selecting a plurality of samples based on the sample selection rule.

Step 906 includes performing multiple Monte Carlo simulations over the plurality of samples.

Step 908 includes receiving a failure rate and a confidence interval value based on the Monte Carlo simulations.

Step 910 includes determining whether the confidence interval value is within a pre-selected threshold.

Step 912*a* includes modifying the sample selection rule and selecting a second plurality of samples when the confidence interval value is greater than a pre-selected threshold.

Step 912*b* includes modifying the integrated circuit based on the failure rate when the confidence interval value is within the pre-selected threshold.

Figure 10:
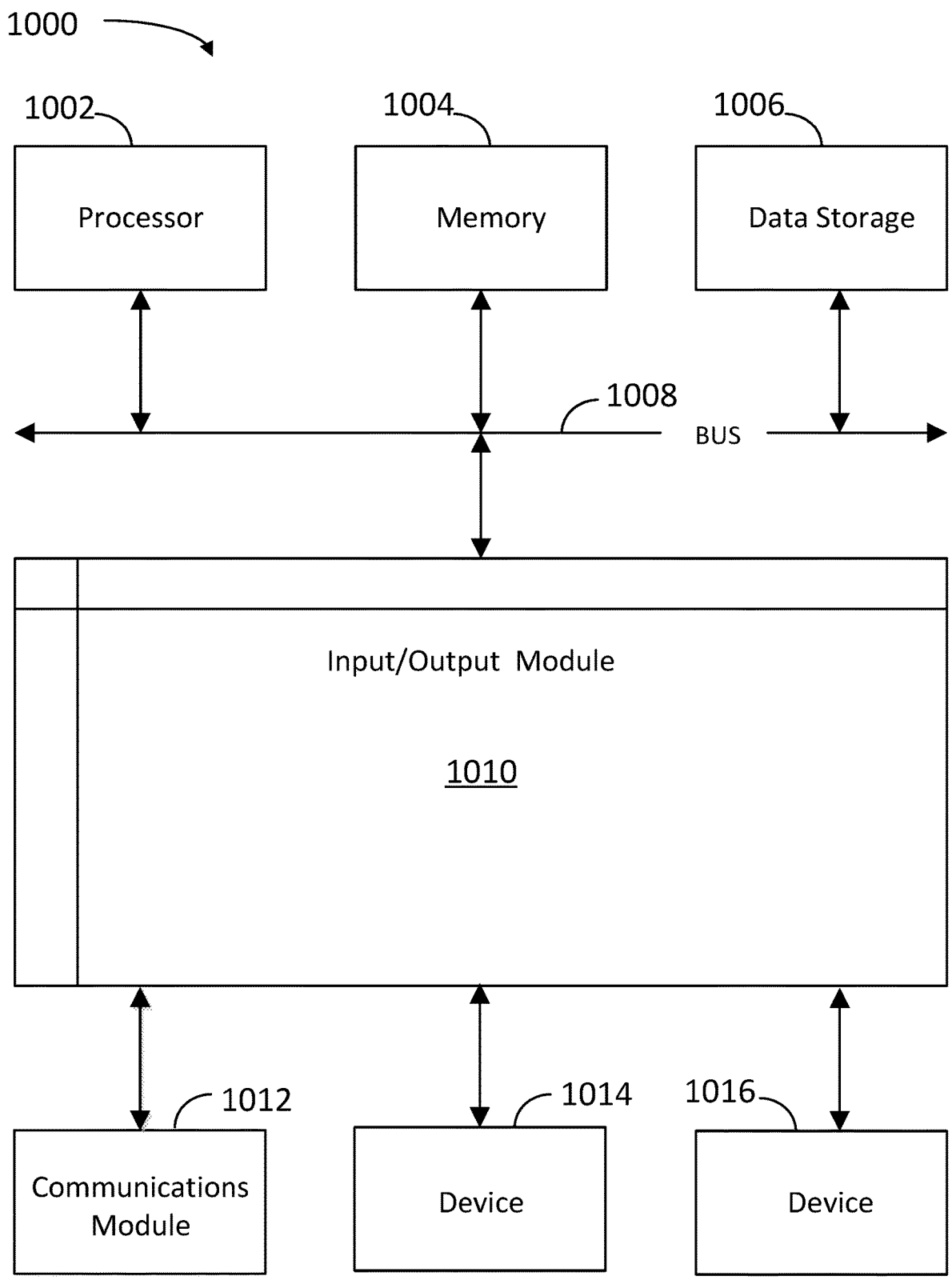
FIG. 10 is a block diagram illustrating an example computer system, according to some embodiments.

FIG. 10 is a block diagram illustrating an example computer system 1000 with which the methods and steps illustrated in FIGS. 8-9 can be implemented, according to some embodiments. In certain aspects, computer system 1000 can be implemented using hardware or a combination of software and hardware, either in a dedicated server, integrated into another entity, or distributed across multiple entities.

Computer system 1000 includes a bus 1008 or other communication mechanism for communicating information, and a processor 1002 coupled with bus 1008 for processing information. By way of example, computer system 1000 can be implemented with one or more processors 1002. Processor 1002 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 1002 may include modules and circuits configured as a 'placing' tool or engine, or a 'routing' tool or engine, to place devices and route channels in a circuit layout, respectively and as disclosed herein.

Computer system 1000 includes, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. Processor 1002 and memory 1004 can be supplemented by, or incorporated in, special purpose logic circuitry.

The instructions may be stored in memory 1004 and implemented in one or more computer program products, e.g., one or more modules of computer program instructions encoded on a computer readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis languages, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions.

Computer system 1000 is coupled via input/output module 1010 to various devices. The input/output module 1010 is any input/output module. Example input/output modules 1010 include data ports such as USB ports. The input/output module 1010 is configured to connect to a communications module 1012. Example communications modules 1012 include networking interface cards, such as Ethernet cards and modems. In certain aspects, the input/output module 1010 is configured to connect to a plurality of devices, such as an input device 1014 and/or an output device 1016. Example input devices 1014 include a keyboard and a pointing device, e.g., a mouse or a trackball, by which a user can provide input to the computer system 1000. Other kinds of input devices 1014 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1016 include display devices, such as an LED (light emitting diode), CRT (cathode ray tube), or LCD (liquid crystal display) screen, for displaying information to the user.

Methods as disclosed herein may be performed by computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein (e.g., as in methods). One or more processors in a multi-processing arrangement may also be employed to execute the sequences of instructions contained in memory 1004. In alternative aspects, hard-wired circuitry may be used in place of, or in combination with, software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 1000 includes servers and personal computer devices. A personal computing device and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 1002 for execution. Such a medium may take many forms, including, but not limited to, non-volatile media, volatile media, and transmission media. Non-volatile media include, for example, optical disks, magnetic disks, or flash memory, such as data storage device 1006. Volatile media include dynamic memory, such as memory 1004. Transmission media include coaxial cables, copper wire, and fiber optics, including the wires that include bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to, a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or "the like" is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
   performing multiple Monte Carlo simulations for an integrated circuit using a first plurality of samples;
   obtaining a performance model of the integrated circuit based on a result of the multiple Monte Carlo simulations;
   determining a failure rate and a confidence interval of the failure rate for the integrated circuit with the performance model;
   determining an importance distribution based on the failure rate for the first plurality of samples, wherein the importance distribution is indicative of a probability that a sample value for the integrated circuit will fail the multiple Monte Carlo simulations;
   selecting a second plurality of samples based on the importance distribution;
   performing a second set of Monte Carlo simulations using the second plurality of samples to reduce the confidence interval of the failure rate; and
   when the confidence interval of the failure rate is larger than a pre-determined value, obtaining an updated performance model and performing new Monte Carlo simulations with new samples selected from an adjusted importance distribution based on the updated performance model.

2. The computer-implemented method of claim 1, further comprising randomly selecting the first plurality of samples.

3. The computer-implemented method of claim 1, wherein performing multiple Monte Carlo simulations for the integrated circuit comprises:
   separating the first plurality of samples into at least a first fold and a second fold;
   performing a first subset of Monte Carlo simulations over the first fold and estimating model accuracy on the second fold; and
   performing a second subset of Monte Carlo simulations over the second fold and estimating the model accuracy on the first fold.

4. The computer-implemented method of claim 1, wherein obtaining the performance model of the integrated circuit comprises:
   assuming a normal distribution for a performance parameter of the integrated circuit centered on a model value of the integrated circuit obtained from the multiple Monte Carlo simulations;
   obtaining a variance with a cross-validation of the multiple Monte Carlo simulations; and
   adjusting a parameter in the model value to reduce the variance.

5. The computer-implemented method of claim 1, wherein obtaining the performance model of the integrated circuit comprises:
   evaluating, for the integrated circuit, multiple outputs associated with a circuit performance;
   determining the failure rate for each of the multiple outputs;
   optimizing the performance model for an output with a highest accuracy to obtain a first optimized model;
   further improving accuracy of a first optimized model as more samples are obtained; and
   optimizing the performance model for the output with a second highest accuracy once simulations for the output with the highest accuracy is complete.

6. The computer-implemented method of claim 1, wherein determining the importance distribution comprises:
   using the performance model to bias the failure rate; and
   finding a normalization constant using the failure rate for the first plurality of samples.

7. The computer-implemented method of claim 1, wherein selecting the second plurality of samples based on the importance distribution comprises:
   forming an auxiliary distribution that has a higher value than the importance distribution for all values of a random variable; and
   selecting a random variable when a value of the random variable is greater than a ratio of the importance distribution to the auxiliary distribution, evaluated with the random variable.

8. The computer-implemented method of claim 1, further comprising modifying the integrated circuit when the failure rate is greater than a pre-selected value.

9. The computer-implemented method of claim 1, wherein the integrated circuit is part of a system on chip, the method further comprising estimating a system on chip performance based on the failure rate.

10. The computer-implemented method of claim 1, wherein performing the second set of Monte Carlo simulations comprises determining a second standard deviation of the performance model that is lower than a first standard deviation of the performance model associated with the first plurality of samples.

11. A system, comprising:

a memory storing instructions; and a processor configured to execute the instructions to cause the system to:

perform multiple simulations for an integrated circuit using a first plurality of samples;

obtain a performance model of the integrated circuit based on a result of the multiple Monte Carlo simulations;

determine a failure rate and a confidence interval of the failure rate for the integrated circuit with the performance model;

determine an importance distribution based on the failure rate for the first plurality of samples, wherein the importance distribution is indicative of a probability that a sample value for the integrated circuit will fail the multiple Monte Carlo simulations;

select a second plurality of samples based on the importance distribution;

perform a second set of simulations using the second plurality of samples to reduce the confidence interval of the failure rate; and when the confidence interval of the failure rate is larger than a pre-determined value, obtain an updated performance model and perform new simulations with new samples selected from an adjusted importance distribution based on the updated performance model.

12. The system of claim 11, wherein the simulations comprise at least one of a Monte Carlo simulation, a pseudo Monte Carlo simulation, or a quasi Monte Carlo simulation, further comprising a Monte Carlo generator configured to provide a pre-selected amount of random numbers for the first plurality of samples.

13. The system of claim 11, further comprising a statistical model engine configured to build a response surface model associating values of a performance characteristic of the integrated circuit with the first plurality of samples.

14. The system of claim 11, further comprising a sample selection engine configured to select a new sample from the first plurality of samples to simulate the integrated circuit.

15. The system of claim 11, wherein to obtain a performance model of the integrated circuit, the processor executes instructions to:

evaluate, for the integrated circuit, multiple outputs associated with a circuit performance;

determine the failure rate for each of the multiple outputs;

optimize the performance model for an output with a highest accuracy to obtain a first optimized model;

further improve accuracy of a first optimized model as more samples are obtained; and to optimize the performance model for the output with a second highest accuracy once simulations for the output with the highest accuracy is complete.

16. The system of claim 11, wherein to select the second plurality of samples based on the importance distribution the processor executes instructions to form an auxiliary distribution that has a higher value than the importance distribution for all values of a random variable, and to select a random variable when a value of the random variable is greater than a ratio of the importance distribution to the auxiliary distribution, evaluated with the random variable.

17. The system of claim 11, wherein to determine the importance distribution, the processor executes instructions to:

use the performance model to bias the failure rate; and find a normalization constant using a failure rate for the first plurality of samples.

18. The system of claim 11, wherein the processor further executes instructions to modify the integrated circuit when the failure rate is greater than a pre-selected value.

* * * * *